(12) United States Patent
Xiao et al.

(10) Patent No.: US 12,314,253 B2
(45) Date of Patent: May 27, 2025

(54) METHODS, SYSTEMS, ELECTRONIC DEVICES, AND STORAGE MEDIA FOR DATABASE TRANSACTION PROCESSING

(71) Applicant: Beijing OceanBase Technology Co., Ltd., Beijing (CN)

(72) Inventors: Jinliang Xiao, Hangzhou (CN); Shanyan Gao, Hangzhou (CN); Fusheng Han, Hangzhou (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/521,723

(22) Filed: Nov. 28, 2023

(65) Prior Publication Data

US 2024/0104089 A1  Mar. 28, 2024

Related U.S. Application Data

(63) Continuation of application No. PCT/CN2022/093816, filed on May 19, 2022.

(30) Foreign Application Priority Data

Jun. 9, 2021  (CN) .......................... 202110642105.7

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC ................ G06F 16/2379; G06F 16/27; G06F 16/24561; G06F 16/2471; G06F 16/273; G06F 16/275; G06F 16/278

(Continued)

(56) References Cited

U.S. PATENT DOCUMENTS

| | | | | |
|---|---|---|---|---|
| 11,500,744 B2* | 11/2022 | Shen | ................... | G06F 11/1451 |
| 2003/0014526 A1* | 1/2003 | Pullara | ................ | H04L 67/1008 |
| | | | | 709/227 |
| 2015/0301910 A1* | 10/2015 | Sathyanarayana | .......................... | |
| | | | | G06F 11/2041 |
| | | | | 714/4.11 |

FOREIGN PATENT DOCUMENTS

| | | |
|---|---|---|
| CN | 102737088 | 10/2012 |
| CN | 103793296 | 5/2014 |

(Continued)

OTHER PUBLICATIONS

International Preliminary Report on Patentability in Appln. No. PCT/CN2022/093816, mailed on Dec. 21, 2023, 11 pages (with English translation).

(Continued)

*Primary Examiner* — Michael Pham
(74) *Attorney, Agent, or Firm* — Fish & Richardson P.C.

(57) ABSTRACT

Methods, systems, electronic devices and computer-readable media for database transaction processing are provided. In an example, after determining to perform primary-secondary switching of a copy, a first server records a context of a database transaction that is currently being executed, sends the context to a second server, and switches a primary copy stored in the first server to a secondary copy. The second server switches a secondary copy stored in the second server to a primary copy, and continues execution of the database transaction based on the context after completing the switching.

20 Claims, 4 Drawing Sheets

(58) Field of Classification Search
USPC .......................................................... 707/703
See application file for complete search history.

(56) References Cited

FOREIGN PATENT DOCUMENTS

| | | |
|---|---|---|
| CN | 105122260 | 12/2015 |
| CN | 108984569 | 12/2018 |
| CN | 109936481 | 6/2019 |
| CN | 112346912 | 2/2021 |
| CN | 113254536 | 8/2021 |
| CN | 117370078 | 1/2024 |
| JP | 2003-186722 | 7/2003 |
| WO | WO 2022/257719 | 12/2022 |
| WO | WO 2023/142543 | 8/2023 |

OTHER PUBLICATIONS

International Search Report and Written Opinion in Appln. No. PCT/CN2022/093816, mailed on Aug. 16, 2022, 14 pages (with English translation).

* cited by examiner

FIG. 1

After determining to perform primary-secondary switching of a copy, a first server records a context of a database transaction that is currently being executed, sends the context to a second server, and switches a primary copy stored in the first server to a secondary copy ~202

The second server switches a secondary copy stored in the second server to a primary copy, and continues execution of the database transaction based on the context after completing the switching ~204

METHODS, SYSTEMS, ELECTRONIC DEVICES, AND STORAGE MEDIA FOR DATABASE TRANSACTION PROCESSING

CROSS-REFERENCE TO RELATED APPLICATIONS

This application is a continuation of PCT Application No. PCT/CN2022/093816, filed on May 19, 2022, which claims priority to Chinese Patent Application No. 202110642105.7, filed on Jun. 9, 2021, and each application is hereby incorporated by reference in its entirety.

TECHNICAL FIELD

One or more embodiments of this specification relate to the field of database technologies, and in particular, to methods, systems, electronic devices, and storage media for database transaction processing.

BACKGROUND

In a distributed relational database system, data usually include a plurality of copies, and different copies can be stored in different servers. The plurality of copies of the data include one primary copy and at least one secondary copy. When a server in which the primary copy is located switches the primary copy stored in the server to a secondary copy, some database transactions may still be in an execution process. If primary-secondary switching is performed in the execution process of these database transactions, these database transactions that are not completely executed can only be rolled back, that is, need to be re-executed, resulting in lower efficiency of executing the database transaction.

SUMMARY

In view of this, one or more embodiments of this specification provide methods, systems, electronic devices, and storage media for database transaction processing, to improve efficiency of executing a database transaction.

To achieve the above-mentioned objective, according to a first aspect of one or more embodiments of this specification, a method for database transaction processing is provided, and includes the following: After determining to perform primary-secondary switching of a copy, a first server records a context of a database transaction that is currently being executed, sends the context to a second server, and switches a primary copy stored in the first server to a secondary copy; and the second server switches a secondary copy stored in the second server to a primary copy, and continues execution of the database transaction based on the context after completing the switching.

According to a second aspect of one or more embodiments of this specification, a system for database transaction processing is provided, and includes: a first server, configured to: after determining to perform primary-secondary switching of a copy, record a context of a database transaction that is currently being executed, send the context to a second server, and switch a primary copy stored in the first server to a secondary copy; and the second server, configured to switch a secondary copy stored in the second server to a primary copy, and continue execution of the database transaction based on the context after completing the switching.

According to a third aspect of one or more embodiments of this specification, an electronic device is provided, and includes a processor and a storage configured to store instructions that can be executed by the processor. The processor runs the executable instructions to implement the following steps: after determining to perform primary-secondary switching of a copy, recording a context of a database transaction that is currently being executed; and sending the context to a second server, and switching a primary copy stored in a first server to a secondary copy, so that the second server continues execution of the database transaction based on the context after switching a secondary copy stored in the second server to a primary copy.

According to a fourth aspect of one or more embodiments of this specification, an electronic device is provided, and includes a processor and a storage configured to store instructions that can be executed by the processor. The processor runs the executable instructions to implement the following steps: obtaining a context of a database transaction sent by a first server; and continuing execution of the database transaction based on the context after switching a secondary copy stored in a second server to a primary copy.

According to a fifth aspect of one or more embodiments of this specification, a computer-readable storage medium is provided. The computer-readable storage medium stores computer instructions. When the instructions are executed by a processor, the following steps are implemented: after determining to perform primary-secondary switching of a copy, recording a context of a database transaction that is currently being executed; and sending the context to a second server, and switching a primary copy stored in a first server to a secondary copy, so that the second server continues execution of the database transaction based on the context after switching a secondary copy stored in the second server to a primary copy.

According to a sixth aspect of one or more embodiments of this specification, a computer-readable storage medium is provided. The computer-readable storage medium stores computer instructions. When the instructions are executed by a processor, the following steps are implemented: obtaining a context of a database transaction sent by a first server; and continuing execution of the database transaction based on the context after switching a secondary copy stored in a second server to a primary copy.

In the method for database transaction processing provided in the embodiments of this specification, before switching the primary copy stored in the first server to the secondary copy, the first server can first record the context of the database transaction that is currently being executed, and send the context to the second server; and after switching the secondary copy stored in the second server to the primary copy, the second server can continue, based on the context sent by the first server, execution of the database transaction that is not completely executed before. As such, the database transaction does not need to be rolled back, and therefore efficiency of executing the database transaction is improved.

DESCRIPTION OF EMBODIMENTS

Some example embodiments are described in detail here, and examples of the example embodiments are presented in the accompanying drawings. When the following descriptions relate to the accompanying drawings, unless specified otherwise, the same numbers in different accompanying drawings represent the same or similar elements. Implementations described in the following example embodiments do not represent all implementations consistent with one or more embodiments of this specification. On the contrary, the implementations are merely examples of apparatuses and methods that are described in the appended claims in detail and consistent with some aspects of one or more embodiments of this specification.

It is worthwhile to note that the steps of the corresponding method are not necessarily performed in the sequence shown and described in this specification in other embodiments. In some other embodiments, the method can include more or fewer steps than those described in this specification. In addition, a single step described in this specification may be split into a plurality of steps in other embodiments for description; and a plurality of steps described in this specification may be combined into a single step in other embodiments for description.

Figure 1:
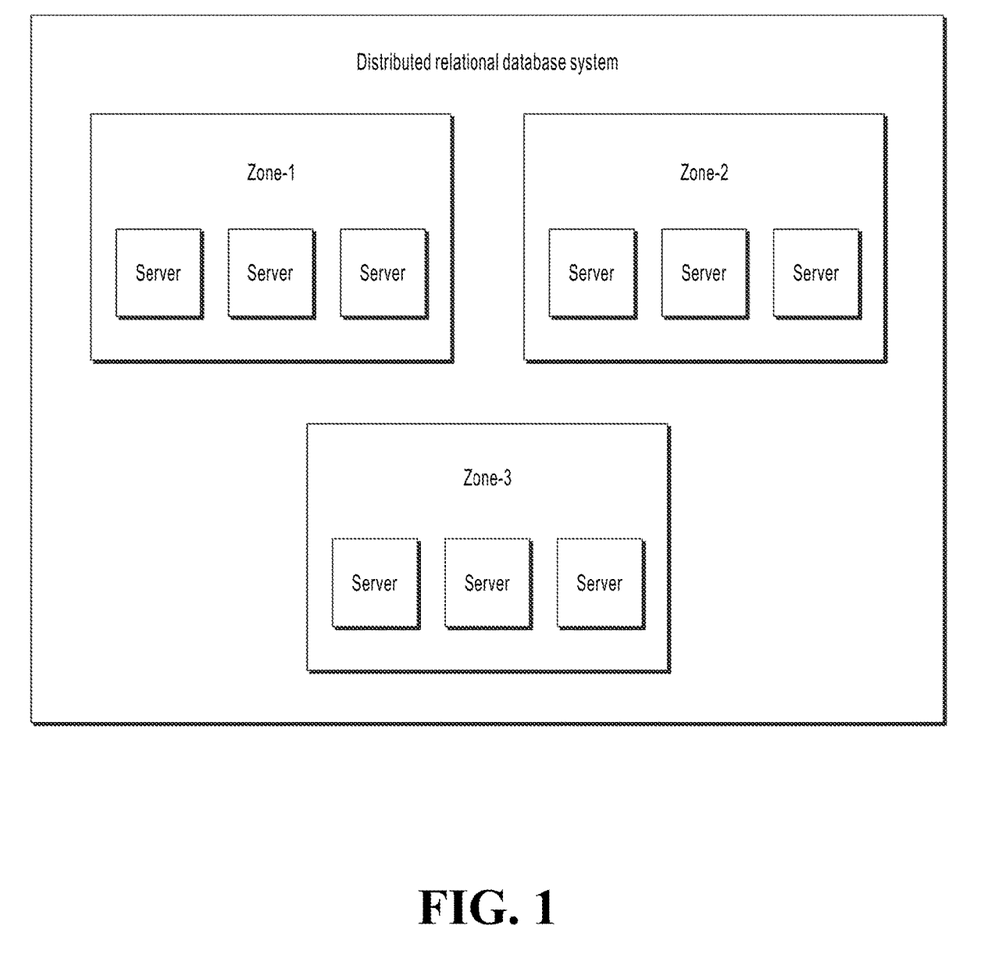
FIG. 1 is an architectural diagram illustrating a possible distributed relational database system.

A distributed relational database system usually includes a plurality of nodes. The nodes are connected to each other by using a network. Each node can be a server, and the server can be configured to store data. In the distributed relational database system, data usually include a plurality of copies, and different copies can be stored in different servers, to ensure data security and provide highly available data services. FIG. 1 is an architectural diagram illustrating a possible distributed relational database system. It can be seen that the distributed relational database system includes a plurality of available zones. FIG. 1 shows three available zones: Zone-1, Zone-2, and Zone-3. Each available zone can include a plurality of servers. Here, one available zone can correspond to one equipment room, and a plurality of servers in the available zone can be a plurality of servers in the equipment room.

The plurality of copies of the data include a primary copy. The primary copy can provide a write service, that is, a server in which the primary copy is located can modify the data. Any copy other than the primary copy is a secondary copy. The secondary copy cannot provide a write service, that is, a server in which the secondary copy is located can only read the data and cannot modify the data.

In some cases, primary-secondary switching of a copy needs to be performed. Primary-secondary switching of a copy means that an original primary copy is switched to a secondary copy, and a secondary copy is switched to a new primary copy. Before the server in which the primary copy is located switches the primary copy stored in the server to a secondary copy, some database transactions may be in an execution process. If primary-secondary switching is performed in the execution process of these database transactions, these database transactions that are not completely executed can only be rolled back, that is, need to be re-executed, resulting in lower efficiency of executing the database transaction.

Figure 2:
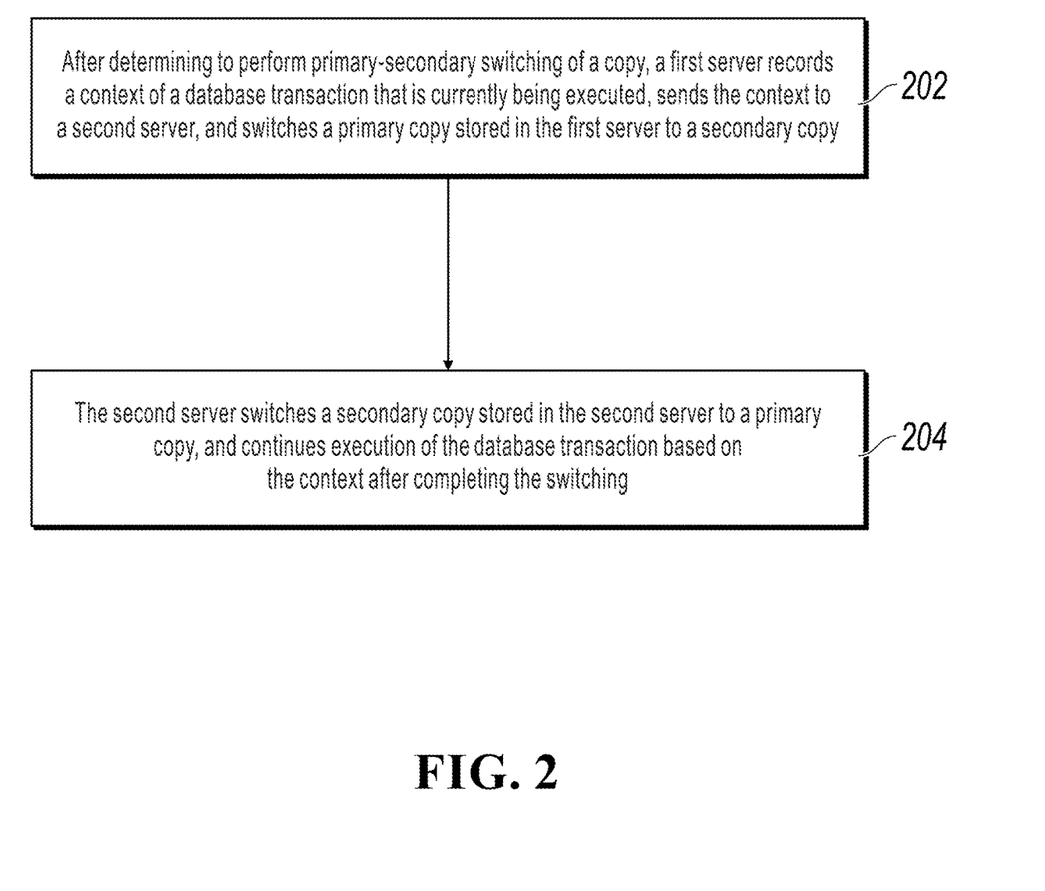
FIG. 2 is a flowchart illustrating a method for database transaction processing, according to some embodiments of this specification.

To alleviate the above-mentioned problem, some embodiments of this specification provide a method for database transaction processing. FIG. 2 is a flowchart illustrating a method for database transaction processing, according to some embodiments of this specification. The method includes the following steps. Step 202: After determining to perform primary-secondary switching of a copy, a first server records a context of a database transaction that is currently being executed, sends the context to a second server, and switches a primary copy stored in the first server to a secondary copy.

Step 204: The second server switches a secondary copy stored in the second server to a primary copy, and continues execution of the database transaction based on the context after completing the switching.

As described above, one piece of data can include a plurality of copies, and different copies are stored in different servers. The plurality of copies of the data includes one primary copy and at least one secondary copy. Here, a server that stores the primary copy can be referred to as the first server, and a server that stores the secondary copy can be referred to as the second server.

Figure 3:
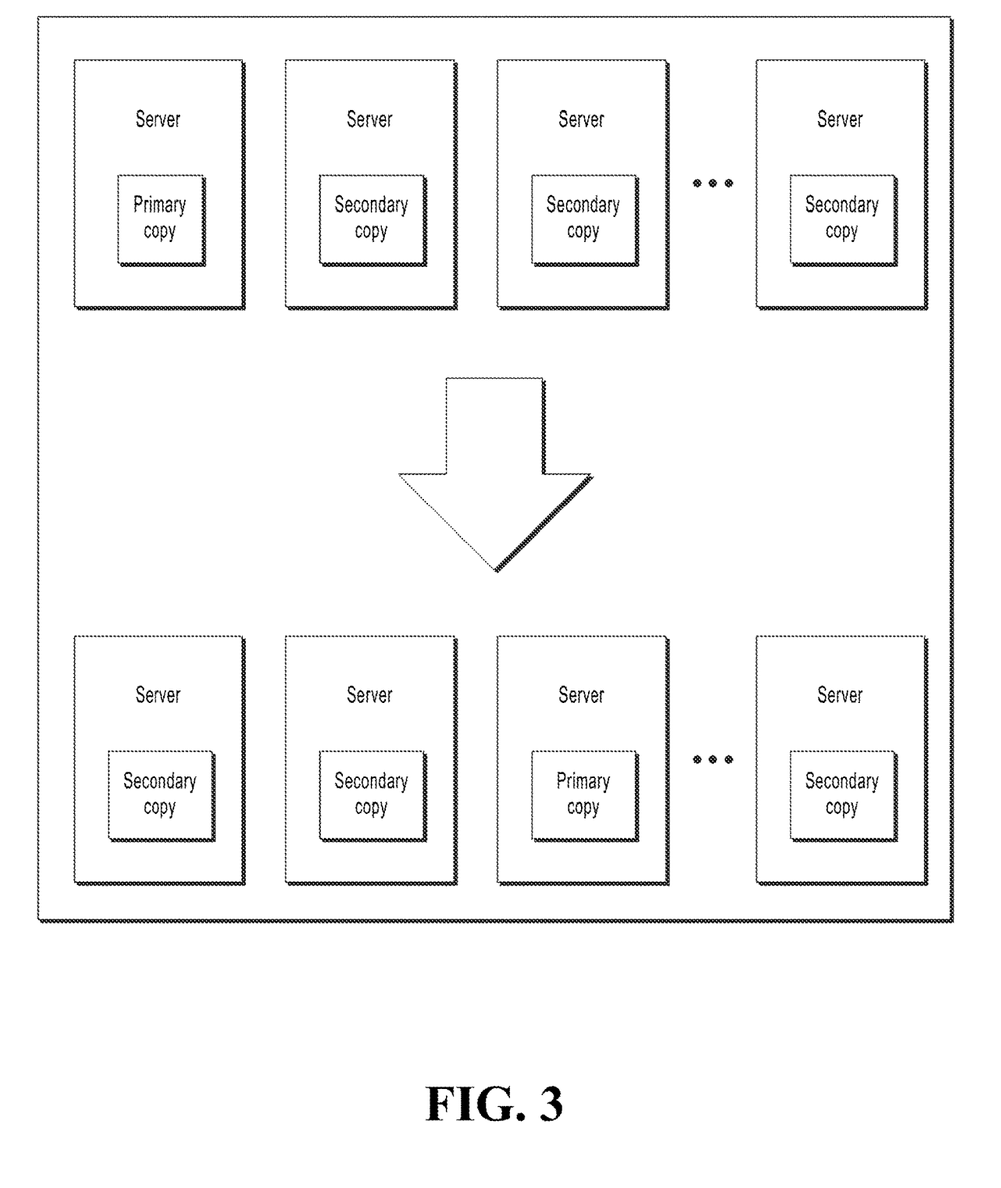
FIG. 3 is a schematic diagram illustrating a scenario in which switching between a primary copy and a secondary copy is performed, according to some embodiments of this specification.

The primary copy provides a write service and the secondary copy does not provide a write service. Therefore, it needs to be ensured that the server that stores the primary copy can run normally, so that a data modification service can be stably provided. By performing switching between the primary copy and the secondary copy, the server that stores the primary copy can be changed. This is an effective method to ensure that the data modification service is stably provided. In some examples, if a load level of the server that stores the primary copy is excessively high, for example, resource utilization of a CPU, a memory, a hard disk, etc. of the server is close to an upper limit, to ensure that a write service is normally provided, the server that stores the primary copy can be changed. In this case, switching between the primary copy and the secondary copy needs to be performed. In some examples, if the server that stores the primary copy needs to be upgraded or maintained based on a plan and cannot continue to provide a service, the server that stores the primary copy needs to be changed. FIG. 3 is a schematic diagram illustrating a scenario in which switching between a primary copy and a secondary copy is performed.

A database transaction is a database operation sequence for accessing and possibly operating various data items. One database transaction can include a plurality of to-be-executed statements. The first server can process the database transaction, that is, can execute a statement in the database transaction. When the first server determines that primary-secondary switching of a copy needs to be performed, the first server may be executing one or more database transactions. In this case, before actually performing switching, the first server can stop executing an uncompleted database transaction, first record the context of the database transaction that is currently being executed, and send the context of the database transaction to the second server. After recording and sending the context, the first server can switch the primary copy stored in the first server to the secondary copy.

The second server is designated as a new server for storing the primary copy. After the first server switches the primary copy stored in the first server to the secondary copy, the second server can switch the secondary copy stored in the second server to the primary copy. After completing the switching, the second server can continue, based on the context of the database transaction recorded by the first server, execution of the database transaction that is not completely executed by the first server before the primary-secondary switching. As such, the database transaction does not need to be rolled back, and therefore efficiency of processing the database transaction is improved.

In the method for database transaction processing provided in the embodiments of this specification, before switching the primary copy stored in the first server to the secondary copy, the first server can first record the context of the database transaction that is currently being executed, and send the context to the second server; and after switching the secondary copy stored in the second server to the primary copy, the second server can continue, based on the context sent by the first server, execution of the database transaction that is not completely executed before. As such, the database transaction does not need to be rolled back, and therefore efficiency of executing the database transaction is improved.

It is worthwhile to note that in a related technology, a database transaction has atomicity, that is, all operations in the database transaction are indivisible, and either all of these operations or none of these operations are performed. In the embodiments of this specification, when primary-secondary switching of a copy is performed, a database transaction that is not completed before the switching is not rolled back, but continues to be executed by a new server that stores a primary copy. To some extent, operations in the database transaction are divided into two parts to be executed by different entities. A part of statements in the database transaction can be executed by the first server, and the other part of the statements in the database transaction can be executed by the second server. However, although the database transaction is executed by different entities, the database transaction still satisfies atomicity. This is because the database transaction still satisfies the needs that either all of these operations or none of these operations are performed, but the operations are not performed by the same server.

In some implementations, the first server can simultaneously execute a plurality of database transactions. After the first server determines that primary-secondary switching of a copy needs to be performed, the first server can stop starting a new database transaction, and stop executing a new statement in the database transaction that is currently being executed.

The first server can determine, by using a plurality of methods, whether to perform primary-secondary switching of a copy. In some implementations, the first server can determine, based on an indication of a third server, whether primary-secondary switching of a copy needs to be performed. Here, the third server can be any server other than the first server. In some examples, the third server can be a server configured to manage a database cluster, and management and control software of the database cluster can be installed in the third server.

In some implementations, the third server can monitor a load level of the first server, for example, can monitor utilization of a CPU, occupation of a memory, etc. of the first server. When the third server determines that the load level of the first server reaches a predetermined load level, it can be considered that the first server cannot reliably provide a write service of data. In this case, the third server can send a switching instruction to the first server, to instruct the first server to perform primary-secondary switching.

In some implementations, the third server can obtain an upgrade or maintenance plan of the server, and when determining, based on the upgrade or maintenance plan, that the first server is to be upgraded or maintained, can send a switching instruction to the first server, to instruct the first server to perform primary-secondary switching. After the first server completes primary-secondary switching of a copy, the first server can be upgraded or maintained.

In the above-mentioned implementations, the first server determines, based on the indication of the third server, whether primary-secondary switching of a copy needs to be performed. However, it can be understood that the first server can independently determine whether primary-secondary switching needs to be performed. For example, the first server can obtain a load level of the first server, and determine, based on the load level of the first server, whether primary-secondary switching of a copy needs to be performed. For another example, the first server can obtain an upgrade or maintenance plan of the server, and automatically initiate primary-secondary switching of a copy at a proper time based on the upgrade or maintenance plan of the server.

In some implementations, the second server can determine, based on an indication of the third server, that the secondary copy stored in the second server needs to be switched to the primary copy. For example, the third server can send a switching instruction to the second server when sending the switching instruction to the first server, so that the second server can perform primary-secondary switching of a copy based on the received switching instruction. In some implementations, the second server can determine, based on an indication of the first server, that the secondary copy stored in the second server needs to be switched to the primary copy.

A state of the server when the database transaction is executed to a current location can be recorded in the context of the database transaction, and the second server can continue execution of the database transaction from an execution breakpoint of the first server based on the context of the database transaction. In some examples, the context of the database transaction can include to-be-operated data and a state machine that correspond to the database transaction.

The first server can simultaneously execute a plurality of database transactions. Therefore, if a plurality of database transactions are currently being executed when the first server determines to perform primary-secondary switching of a copy, the first server needs to record contexts of the plurality of database transactions, and send the contexts of the plurality of databases to the second server. This increases bandwidth needs on the server to some extent. Therefore, in some implementations, after determining to perform primary-secondary switching of a copy, the first server may first not stop executing the database transaction, but can continue to execute the database transaction for predetermined duration. As such, after the predetermined duration, some database transactions that need to be executed for a relatively short time are completely executed. Therefore, contexts of the database transactions that are executed no longer need to be recorded, to reduce an amount of to-be-transmitted data.

In some implementations, the predetermined duration can be adaptively updated. Specifically, after determining to perform primary-secondary switching of a copy, the first server can estimate remaining execution duration corresponding to the database transaction that is currently being executed. If the remaining execution duration is less than the predetermined duration, the predetermined duration can be updated to the remaining execution duration, so that the first server can wait for a relatively short time, to more quickly perform primary-secondary switching. Correspondingly, if the remaining execution duration is longer than the predetermined duration, the predetermined duration can still be an original value, and does not need to be updated.

In some implementations, after determining to perform primary-secondary switching of a copy, the first server can estimate remaining execution duration corresponding to the database transaction that is currently being executed. If the remaining execution duration is less than a predetermined duration threshold, the first server can perform primary-secondary switching of a copy after the remaining execution duration. If the remaining execution duration is greater than a predetermined duration threshold, the first server does not need to wait, that is, can stop all execution behaviors, directly record the context of the database transaction that is currently being executed, and switch the primary copy stored in the first server to the secondary copy. When the remaining execution duration is greater than the predetermined duration threshold, it means that the first server needs to wait for a relatively long time to complete the database transaction that is currently being executed. However, a longer time that the first server waits for indicates lower reliability of a write service provided by the primary copy. Therefore, when the time that the first server needs to wait for is greater than the predetermined duration threshold, the first server does not need to wait, to ensure reliability of the write service provided by the primary copy.

When the remaining execution duration corresponding to the database transaction that is currently being executed is estimated, there can be a plurality of implementations. In some implementations, the remaining execution duration can be calculated based on a quantity of database transactions that are currently being executed and an average execution time corresponding to the database transaction. In some implementations, a remaining unexecuted statement in the database transaction that is currently being executed can be obtained, and the remaining execution duration corresponding to the database transaction can be determined based on a quantity of unexecuted statements and average duration needed for executing a single statement.

In some implementations, when the first server sends the context to the second server, the first server can synchronize the context to each server that stores a secondary copy, so that the second server can continue execution of the database transaction based on the context after completing the switching from the secondary copy to the primary copy.

In the method for database transaction processing provided in the embodiments of this specification, before switching the primary copy stored in the first server to the secondary copy, the first server can first record the context of the database transaction that is currently being executed, and send the context to the second server; and after switching the secondary copy stored in the second server to the primary copy, the second server can continue, based on the context sent by the first server, execution of the database transaction that is not completely executed before. As such, the database transaction does not need to be rolled back, and therefore efficiency of executing the database transaction is improved.

Figure 4:
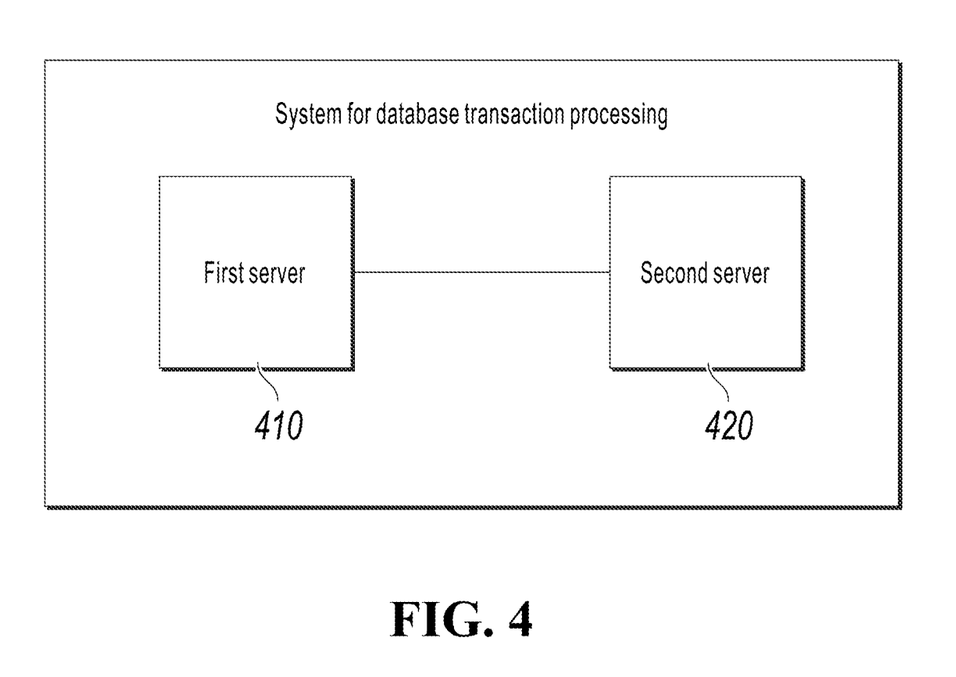
FIG. 4 is a schematic diagram illustrating a structure of a system for database transaction processing, according to some embodiments of this specification.

Some embodiments of this specification further provide a system for database transaction processing. FIG. 4 is a schematic diagram illustrating a structure of a system for database transaction processing, according to some embodiments of this specification. The system includes: a first server 410, configured to: after determining to perform primary-secondary switching of a copy, record a context of a database transaction that is currently being executed, send the context to a second server, and switch a primary copy stored in the first server to a secondary copy; and the second server 420, configured to switch a secondary copy stored in the second server to a primary copy, and continue execution of the database transaction based on the context after completing the switching.

For other implementations corresponding to the system for database transaction processing provided in the embodiments of this specification, references can be made to various implementations of the above-mentioned method for database transaction processing. Implementations are not described here.

In the system for database transaction processing provided in the embodiments of this specification, before switching the primary copy stored in the first server to the secondary copy, the first server can first record the context of the database transaction that is currently being executed, and send the context to the second server; and after switching the secondary copy stored in the second server to the primary copy, the second server can continue, based on the context sent by the first server, execution of the database transaction that is not completely executed before. As such, the database transaction does not need to be rolled back, and therefore efficiency of executing the database transaction is improved.

Figure 5:
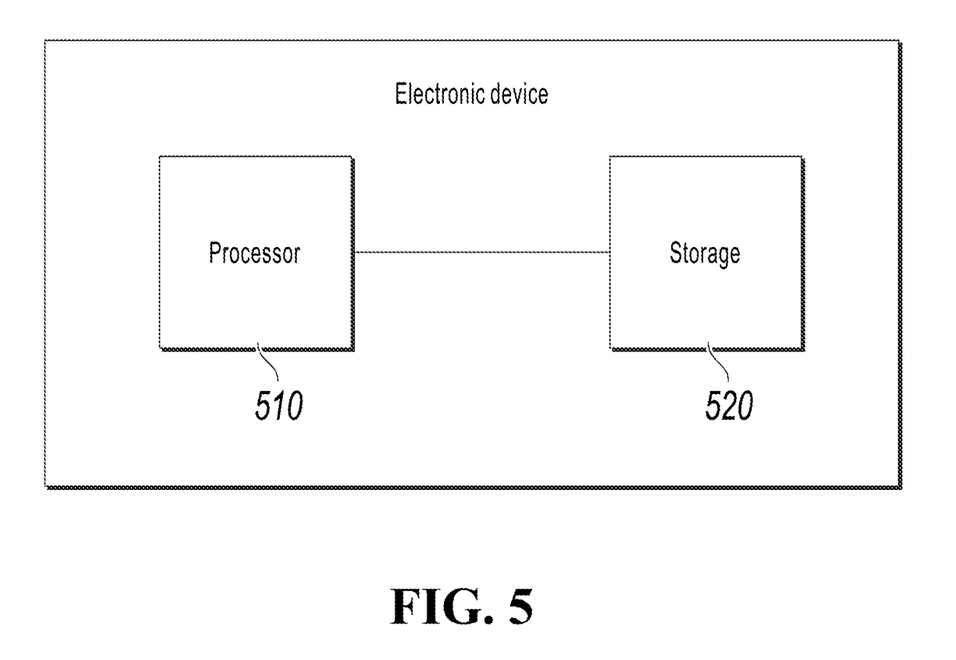
FIG. 5 is a schematic diagram illustrating a structure of an electronic device, according to some embodiments of this specification.

Some embodiments of this specification further provide an electronic device. FIG. 5 is a schematic diagram illustrating a structure of an electronic device, according to some embodiments of this specification. The electronic device includes a processor 510 and a storage 520 configured to store instructions that can be executed by the processor. The processor runs the executable instructions to implement the following steps: after determining to perform primary-secondary switching of a copy, recording a context of a database transaction that is currently being executed; and sending the context to a second server, and switching a primary copy stored in a first server to a secondary copy, so that the second server continues execution of the database transaction based on the context after switching a secondary copy stored in the second server to a primary copy.

The electronic device provided in the embodiments of this specification can implement any above-mentioned step performed by the first server. These steps and actions are described in detail above, and therefore are not described here.

In the electronic device provided in the embodiments of this specification, before switching the primary copy stored in the first server to the secondary copy, the first server can first record the context of the database transaction that is currently being executed, and send the context to the second server; and after switching the secondary copy stored in the second server to the primary copy, the second server can continue, based on the context sent by the first server, execution of the database transaction that is not completely executed before. As such, the database transaction does not need to be rolled back, and therefore efficiency of executing the database transaction is improved.

Some embodiments of this specification further provide an electronic device. A structure of the electronic device is shown in FIG. 5. A processor in the electronic device can implement the following steps: obtaining a context of a database transaction sent by a first server; and continuing execution of the database transaction based on the context after switching a secondary copy stored in a second server to a primary copy.

The electronic device provided in the embodiments of this specification can implement any above-mentioned step performed by the second server. These steps and actions are described in detail above, and therefore are not described here.

In the electronic device provided in the embodiments of this specification, before switching the primary copy stored in the first server to the secondary copy, the first server can first record the context of the database transaction that is currently being executed, and send the context to the second server; and after switching the secondary copy stored in the second server to the primary copy, the second server can continue, based on the context sent by the first server, execution of the database transaction that is not completely executed before. As such, the database transaction does not need to be rolled back, and therefore efficiency of executing the database transaction is improved.

Some embodiments of this specification further provide a computer-readable storage medium. The computer-readable storage medium stores computer instructions. When the instructions are executed by a processor, the following steps are implemented: after determining to perform primary-secondary switching of a copy, recording a context of a database transaction that is currently being executed; and sending the context to a second server, and switching a primary copy stored in a first server to a secondary copy, so that the second server continues execution of the database transaction based on the context after switching a secondary copy stored in the second server to a primary copy.

Some embodiments of this specification further provide a computer-readable storage medium. The computer-readable storage medium stores computer instructions. When the instructions are executed by a processor, the following steps are implemented: obtaining a context of a database transaction sent by a first server; and continuing execution of the database transaction based on the context after switching a secondary copy stored in a second server to a primary copy.

It is worthwhile to further note that the terms "include", "comprise", or any other variant thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the existence of additional identical elements in the process, method, product, or device that includes the element.

Specific embodiments of this specification are described above. Other embodiments fall within the scope of the appended claims. In some cases, the actions or steps described in the claims can be performed in a sequence different from that in some embodiments and desired results can still be achieved. In addition, the process depicted in the accompanying drawings does not necessarily need a particular sequence or consecutive sequence to achieve the desired results. In some implementations, multi-tasking and parallel processing are feasible or may be advantageous.

Terms used in one or more embodiments of this specification are merely used to describe specific embodiments, and are not intended to limit the one or more embodiments of this specification. The terms "a" and "the" of singular forms used in one or more embodiments of this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. may be used in one or more embodiments of this specification to describe various types of information, the information is not limited to these terms. These terms are merely used to differentiate between information of the same type. For example, without departing from the scope of one or more embodiments of this specification, first information can also be referred to as second information, and similarly, the second information can be referred to as the first information. Depending on the context, for example, the word "if" used here can be explained as "while", "when", or "in response to determining".

The above-mentioned descriptions are merely example embodiments of one or more embodiments of this specification, but are not intended to limit the one or more embodiments of this specification. Any modification, equivalent replacement, improvement, etc. made without departing from the spirit and principle of the one or more embodiments of this specification shall fall within the protection scope of the one or more embodiments of this specification.

What is claimed is:

1. A computer-implemented method for database transaction processing, comprising:
    after determining to perform primary-secondary switching of a copy, recording, by a first server, a context of a database transaction that is currently being executed; and
    sending, by the first server, the context to a second server; and
    switching, by the first server, a primary copy stored in the first server to a secondary copy; and
    switching, by the second server, a secondary copy stored in the second server to a primary copy; and
    continuing execution of the database transaction, by the second server, based on the context after switching the secondary copy stored in the second server to the primary copy; and
    determining, by the first server, a remaining execution duration corresponding to an additional database transaction that is currently being executed; and
    determining, by the first server, whether the remaining execution duration is less than a predetermined duration; and
    in response to determining that the remaining execution duration is less than the predetermined duration, updating, by the first server, the predetermined duration to the remaining execution duration; and
    switching, by the first server, an additional primary copy stored in the first server to an additional secondary copy after the predetermined duration.

2. The computer-implemented method according to claim 1, wherein the computer-implemented method further comprises:
    after determining to perform primary-secondary switching of a copy, stopping, by the first server, starting a new database transaction, and stopping executing a new statement in the database transaction that is currently being executed.

3. The computer-implemented method according to claim 1, wherein the first server determines, based on a received switching instruction, to perform primary-secondary switching of a copy, and the received switching instruction is sent by a third server to the first server.

4. The computer-implemented method according to claim 3, wherein the received switching instruction is generated by the third server based on a load level of the first server.

5. The computer-implemented method according to claim 3, wherein the received switching instruction is generated by the third server based on an upgrade or maintenance plan of the first server.

6. The computer-implemented method according to claim 1, wherein the switching, by a first server, a primary copy stored in the first server to a secondary copy comprises:
switching, by the first server, the primary copy stored in the first server to the secondary copy after the predetermined duration.

7. The computer-implemented method according to claim 1, wherein the context comprises to-be-operated data and a state machine that correspond to the database transaction that is currently being executed.

8. A computer-implemented system for database transaction processing, comprising:
a first server comprising at least one first processor coupled to at least one first storage, wherein the at least one first storage stores first instructions for execution by the at least one first processor to:
after determining to perform primary-secondary switching of a copy,
record a context of a database transaction that is currently being executed, and
send the context to a second server; and
switch a primary copy stored in the first server to a secondary copy; and
the second server comprising at least one second processor coupled to at least one second storage, wherein the at least one second storage stores second instructions for execution by the at least one second processor to:
switch a secondary copy stored in the second server to a primary copy; and
continue execution of the database transaction based on the context after switching the secondary copy stored in the second server to the primary copy; and
wherein the first instructions are for execution by the at least one first processor to:
determine a remaining execution duration corresponding to an additional database transaction that is currently being executed; and
determine whether the remaining execution duration is less than a predetermined duration; and
in response to determining that the remaining execution duration is less than the predetermined duration, update the predetermined duration to the remaining execution duration; and
switch an additional primary copy stored in the first server to an additional secondary copy after the predetermined duration.

9. The computer-implemented system according to claim 8, wherein the first instructions are for execution by the at least one first processor to:
after determining to perform primary-secondary switching of a copy, stop starting a new database transaction, and stop executing a new statement in the database transaction that is currently being executed.

10. The computer-implemented system according to claim 8, wherein the first instructions are for execution by the at least one first processor to determine, based on a received switching instruction, to perform primary-secondary switching of a copy, wherein the received switching instruction is sent by a third server to the first server.

11. The computer-implemented system according to claim 10, wherein the received switching instruction is generated by the third server based on a load level of the first server.

12. The computer-implemented system according to claim 10, wherein the received switching instruction is generated by the third server based on an upgrade or maintenance plan of the first server.

13. The computer-implemented system according to claim 8, wherein the first instructions are for execution by the at least one first processor to switch the primary copy stored in the first server to the secondary copy after the predetermined duration.

14. The computer-implemented system according to claim 8, wherein the context comprises to-be-operated data and a state machine that correspond to the database transaction that is currently being executed.

15. An electronic device, comprising:
at least one processor; and
at least one storage, configured to store instructions that, when executed by the at least one processor, perform one or more operations comprising:
after determining to perform primary-secondary switching of a copy, recording a context of a database transaction that is currently being executed; and
sending the context to a second server; and
switching a primary copy stored in a first server to a secondary copy, so that the second server continues execution of the database transaction based on the context after switching a secondary copy stored in the second server to a primary copy; and
determining a remaining execution duration corresponding to an additional database transaction that is currently being executed; and
determining whether the remaining execution duration is less than a predetermined duration; and
in response to determining that the remaining execution duration is less than the predetermined duration, updating the predetermined duration to the remaining execution duration; and
switching an additional primary copy stored in the first server to an additional secondary copy after the predetermined duration.

16. The electronic device according to claim 15, wherein the one or more operations further comprise:
after determining to perform primary-secondary switching of a copy, stopping, by the first server, starting a new database transaction, and stopping executing a new statement in the database transaction that is currently being executed.

17. The electronic device according to claim 15, wherein the determining to perform primary-secondary switching of a copy is based on a received switching instruction, and the received switching instruction is sent by a third server to the first server.

18. The electronic device according to claim 17, wherein the received switching instruction is generated by the third server based on a load level of the first server, or an upgrade or maintenance plan of the first server.

19. The electronic device according to claim 15, wherein the switching a primary copy stored in the first server to a secondary copy comprises:
switching the primary copy stored in the first server to the secondary copy after the predetermined duration.

20. The electronic device according to claim 15, wherein the context comprises to-be-operated data and a state machine that correspond to the database transaction that is currently being executed.

* * * * *